(12) United States Patent
Ohayon et al.

(10) Patent No.: US 7,948,933 B2
(45) Date of Patent: May 24, 2011

(54) REMOTE TRANSMISSION SYSTEM

(75) Inventors: Rony Haim Ohayon, Rehovot (IL);
Avichai Cohen, Ganei-Tikva (IL)

(73) Assignee: LiveU Ltd., Kfar Saba (IL)

( * ) Notice: Subject to any disclaimer, the term of this patent is extended or adjusted under 35 U.S.C. 154(b) by 765 days.

(21) Appl. No.: 11/845,071

(22) Filed: Aug. 26, 2007

(65) Prior Publication Data
US 2008/0075031 A1 Mar. 27, 2008

Related U.S. Application Data

(60) Provisional application No. 60/847,148, filed on Sep. 26, 2006.

(51) Int. Cl.
*H04W 4/00* (2009.01)
(52) U.S. Cl. ........................................ 370/328; 370/338
(58) Field of Classification Search .................. 370/316, 370/328, 338, 236, 252, 536, 537
See application file for complete search history.

(56) References Cited

U.S. PATENT DOCUMENTS

| | | | |
|---|---|---|---|
| 5,280,470 A | 1/1994 | Buhrke et al. | |
| 6,496,477 B1 | 12/2002 | Perkins | |
| 6,510,553 B1 | 1/2003 | Hazra | |
| 6,647,015 B2 | 11/2003 | Malkemes et al. | |
| 6,754,872 B2 | 6/2004 | Zhang et al. | |
| 6,757,256 B1 | 6/2004 | Anandakumar et al. | |
| 6,785,330 B1 | 8/2004 | Whealton et al. | |
| 6,831,574 B1 | 12/2004 | Mills et al. | |
| 6,842,446 B2 | 1/2005 | Everson et al. | |
| 6,987,732 B2 | 1/2006 | Gracon et al. | |
| 7,082,221 B1 | 7/2006 | Jiang | |
| 7,151,762 B1 | 12/2006 | Ho et al. | |
| 7,237,032 B2 | 6/2007 | Gemmell | |
| 7,237,033 B2 | 6/2007 | Weigand et al. | |
| 7,292,571 B2 | 11/2007 | Brown | |
| 7,324,491 B1 | 1/2008 | Benveniste | |
| 7,542,456 B2 | 6/2009 | Garg et al. | |
| 2002/0040479 A1 | 4/2002 | Ehrman et al. | |
| 2002/0054578 A1* | 5/2002 | Zhang et al. ................... | 370/328 |
| 2002/0146232 A1 | 10/2002 | Harradine et al. | |
| 2003/0016770 A1 | 1/2003 | Trans et al. | |
| 2003/0046708 A1 | 3/2003 | Jutzi | |
| 2003/0074554 A1 | 4/2003 | Roach et al. | |
| 2004/0013192 A1 | 1/2004 | Kennedy | |
| 2004/0025186 A1 | 2/2004 | Jennings et al. | |
| 2004/0098748 A1 | 5/2004 | Bo et al. | |
| 2004/0133917 A1 | 7/2004 | Schilling | |
| 2004/0180696 A1 | 9/2004 | Foore et al. | |
| 2005/0265383 A1* | 12/2005 | Melpignano et al. ......... | 370/465 |
| 2006/0015917 A1* | 1/2006 | Rozental ........................ | 725/111 |
| 2006/0062242 A1 | 3/2006 | Dacosta | |
| 2007/0083899 A1 | 4/2007 | Compton et al. | |
| 2007/0121678 A1 | 5/2007 | Brooks et al. | |

(Continued)

FOREIGN PATENT DOCUMENTS

GB 2428529 1/2007

(Continued)

*Primary Examiner* — Brian D Nguyen
(74) *Attorney, Agent, or Firm* — AlphaPatent Associates Ltd.; Daniel J. Swirsky

(57) ABSTRACT

A virtual broadband transmitting unit includes a stream generator to generate a multiplicity of data streams from an incoming media datastream, and a transmission manager to control the upload of the multiplicity of data streams along a multiplicity of transmission channels to at least one wireless communication network. A virtual broadband receiver includes means to receive a multiplicity of media data streams from a multiplicity of data connections, and an assembly engine to assemble the data streams into a single media stream.

21 Claims, 9 Drawing Sheets

U.S. PATENT DOCUMENTS

| | | |
|---|---|---|
| 2007/0136777 A1 | 6/2007 | Hasek et al. |
| 2007/0207832 A1 | 9/2007 | Gerardi et al. |
| 2007/0247515 A1 | 10/2007 | Roman |
| 2008/0034396 A1 | 2/2008 | Lev |

FOREIGN PATENT DOCUMENTS

| | | |
|---|---|---|
| WO | WO03098850 | 11/2003 |
| WO | WO2005060300 | 6/2005 |
| WO | WO2009/093252 | 7/2009 |

* cited by examiner

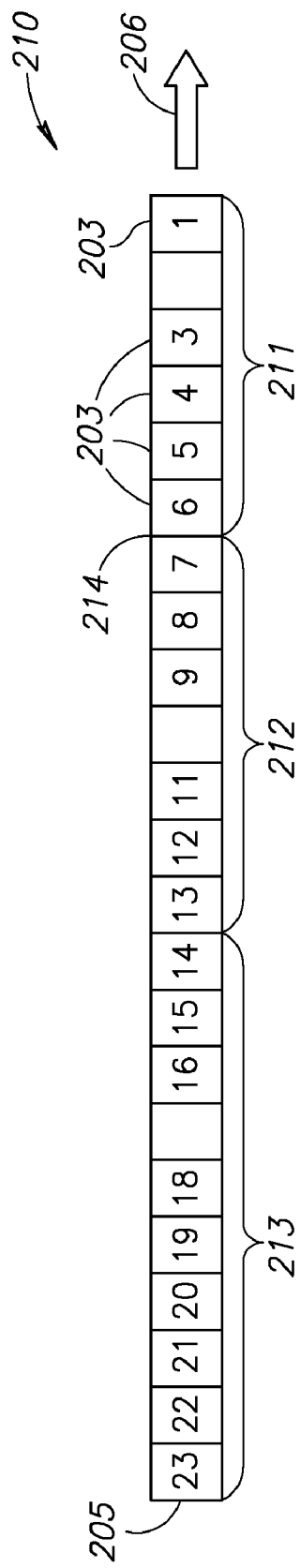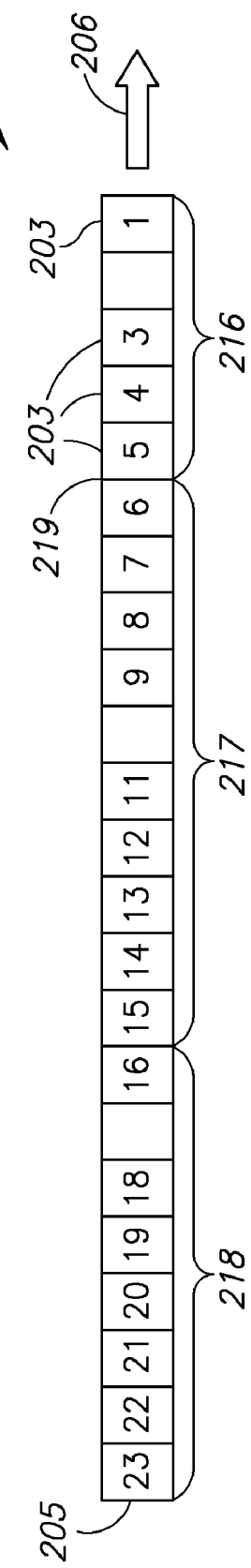
FIG.8A
FIG.8B

REMOTE TRANSMISSION SYSTEM

CROSS-REFERENCE TO RELATED APPLICATIONS

This application claims benefit from U.S. Provisional Patent Application No. 60/847,148, filing date Sep. 26, 2006, which is hereby incorporated in its entirety by reference.

FIELD OF THE INVENTION

The present invention relates to remote upload of media content generally and to doing so over a wireless communications network in particular.

BACKGROUND OF THE INVENTION

Remote upload of media content is known in the art. Such uploads are typically used to provide real time, or near real time, coverage of news/sports events occurring outside of a prepared television studio. Camera crews are often sent to film live events in a variety of locations and the video/audio feed is transmitted back to the studio where it is broadcast.

News/sports organizations use wireless broadband connections to transmit live media content back to the studio. FIGS. 1A and 1B, to which reference is now made, illustrate technologies currently used to provide real time remote broadcasts.

FIG. 1A shows a video camera 5 that is used to film a news event at a remote location. Camera 5 is connected by a cable 10 to a satellite news gathering (SNG) van 15. SNG van 15 has an antenna 20 on its roof that transmits broadcast data to a relay satellite 25 in orbit around the earth. Relay satellite 25 then transmits the data to a receiving dish 30 at television studio 35.

SNG van 15 typically contains a variety of equipment (not shown), for example, a video encoder, satellite modem and an editing station. This equipment is used to process and transmit the data to relay satellite 25. SNG van 15 then uses a broadband connection to upload the data to satellite 25 via antenna 20. The data is then downloaded to studio 35, where it is typically edited and broadcasted.

FIG. 1B illustrates how microwave technology is used for live remote broadcasts. Functionally analogous to SNG 15 in FIG. 1A, electronic news gathering (ENG) van 16 processes data from camera 5 before transmission. However, antenna 40 uploads the data using microwave transmissions, and instead of relay satellite 25, the data is uploaded to relatively local microwave relay station 45. The data is then relayed to studio 35 via internet 46 or a wire line connection 48.

Satellite and microwave technologies have similar operating constraints. For example, both technologies require "line of sight" connections. There must be an unobstructed line between antenna 20 and relay satellite 25 in order to upload the broadcast data. Similarly, there must be an unobstructed line between antenna 40 and microwave relay station 45 in order to use microwave technology. Accordingly, these technologies are inappropriate for use from some locations. For example, neither technology can be used from within an underground parking garage. Tall buildings and/or other topographic features impact on the usability of microwave technology, and to a lesser extent, that of satellite technology as well.

Another constraint is that both technologies require the prior agreement of the operator responsible for the relay installation. Neither technology can be used without the provision of dedicated resources by the operator.

Furthermore, SNG and ENG vans 15 and 16 require serviceable roads to access remote broadcast locations. There are smaller, "luggable" units available, known as "flyaways" which may be used as an alternative to SNG and ENG vans 15 and 16. Flyaways may be brought to the remote location using other modes of transportation, including, for example, airplane, helicopter or all terrain vehicles. They are, however, still bulky and difficult to carry far by hand. A flyaway is typically split into two separate units, each weighing approximately 40 kg.

Inmarsat, a United Kingdom company, markets a line of Broadband Global Area Network (BGAN) products which are considerably lighter and more compact than flyaways. Such products, however, are limited to an upload bandwidth of only 256 Kbps-512 Kbps.

SUMMARY OF THE PRESENT INVENTION

There is provided, in accordance with a preferred embodiment of the present invention, a virtual broadband transmitting unit including a stream generator to generate a multiplicity of data streams from an incoming media datastream, and a transmission manager to control the upload of the multiplicity of data streams along a multiplicity of transmission channels to at least one wireless communication network.

Additionally, in accordance with a preferred embodiment of the present invention, the incoming media data stream includes at least one of video and audio data.

Moreover, in accordance with a preferred embodiment of the present invention, the unit also includes a video encoder to encode the media data stream.

Further, in accordance with a preferred embodiment of the present invention, the at least one wireless network is at least one of the following: a mobile cellular network, a WiFi network, a WiMax network and a satellite network.

Still further, in accordance with a preferred embodiment of the present invention, the stream generator includes a data packet generator including at least one of a forward error correction (FEC) processor to provide FEC codes to the datastream, a packet encapsulator to generate numbered data packets from the data stream; and an interleaver to shuffle the data packets.

Additionally, in accordance with a preferred embodiment of the present invention, the stream generator also includes a queue buffer to receive the data packets from the packet generator and a retransmission queue to store copies of the packets for retransmission.

Moreover, in accordance with a preferred embodiment of the present invention, the stream generator includes a multiplicity of modems to transmit the multiplicity of data streams.

Further, in accordance with a preferred embodiment of the present invention, each modem includes an associated modem manager and each associated modem manager includes means to pull a next data packet from the data packet generator for transmission via the modem.

Still further, in accordance with a preferred embodiment of the present invention, the unit also includes a back channel for receiving feedback regarding at least one of the timeliness and quality of the multiplicity of data streams.

Additionally, in accordance with a preferred embodiment of the present invention, the feedback includes at least one of missing data packets, reconstructed data packets, serial numbers and time stamps of packets received, and requests for retransmission of data.

Moreover, in accordance with a preferred embodiment of the present invention, the transmission manager includes a traffic analyzer to analyze the feedback and adjust settings for components of the stream generator in response to the analysis.

Further, in accordance with a preferred embodiment of the present invention, the transmission manager includes means to search a retransmission queue to locate a copy of at least one of the missing data packets and to forward a found copy for retransmission.

Still further, in accordance with a preferred embodiment of the present invention, the components include at least one of a video encoder, a FEC (forward error correction) processor, a packet encapsulator, an interleaver, a queue buffer, and a modem manager.

There is also provided, in accordance with a preferred embodiment of the present invention, a virtual broadband receiver including means to receive a multiplicity of media data streams from a multiplicity of data connections, and an assembly engine to assemble the data streams into a single media stream.

Additionally, in accordance with a preferred embodiment of the present invention, the media data streams include at least one of video and audio data.

Moreover, in accordance with a preferred embodiment of the present invention, the data streams include a series of data packets with serial numbers and arriving in a generally non serial order.

Further, in accordance with a preferred embodiment of the present invention, the assembly engine includes a jitter buffer including storage spaces for the data packets to be inserted in logical order according to the serial numbers.

Still further, in accordance with a preferred embodiment of the present invention, the jitter buffer also includes means to view a logical receiving window comprising an area of the jitter buffer associated with the data packets possessing generally recently issued serial numbers, means to view a logical retransmission window comprising an area of the jitter buffer associated with the data packets possessing less recently issued serial numbers than those associated with the logical receiving window, and means to view an logical output window comprising an area of the jitter buffer associated with data packets possessing less recently issued serial numbers than those associated with the logical receiving window.

Additionally, in accordance with a preferred embodiment of the present invention, the data packets also include FEC packets.

Moreover, in accordance with a preferred embodiment of the present invention, the assembly engine also includes a FEC decoder to use the FEC data to reconstruct improperly received data packets and to insert the reconstructed data packets into the smart jitter buffer as per their associated serial numbers.

Further, in accordance with a preferred embodiment of the present invention, the assembly engine also includes a retransmit requester to request retransmission of the improperly received data packets whose associated serial numbers are logically located in the retransmission window.

Still further, in accordance with a preferred embodiment of the present invention, the receiver also includes a back channel through which the retransmit request can be transmitted, and a back channel manager to control the operations of the back channel.

Additionally, in accordance with a preferred embodiment of the present invention, the receiver a statistics collector to collect statistics from the operation of the smart jitter buffer.

Moreover, in accordance with a preferred embodiment of the present invention, the statistics include time stamps and the serial numbers associated with at least one of the following: the data packets, the empty spaces, the reconstructed data packets, and the retransmission requests.

Further, in accordance with a preferred embodiment of the present invention, the receiver also includes an output rate controller to regulate the rate at which the data packets are released from the output window.

Still further, in accordance with a preferred embodiment of the present invention, the receiver also includes a video decoder to decode video data included in the data packets.

There is also provided, in accordance with a preferred embodiment of the present invention, a method for remote reporting including organizing video data generated at a remote reporting location into data packets, and uploading the data packets via a multiplicity of modems through at least one wireless network to a broadcasting station.

Additionally, in accordance with a preferred embodiment of the present invention, the at least one wireless network is at least one of the following: a cellular network, WIFI, WIMAX or satellite.

Moreover, in accordance with a preferred embodiment of the present invention, the at least one wireless network is at least two separate cellular networks.

Further, in accordance with a preferred embodiment of the present invention, the at least two separate cellular networks use at least two different mobile telephone technologies.

Still further, in accordance with a preferred embodiment of the present invention, the method also includes receiving feedback regarding the success of the uploading, analyzing the feedback, and adjusting operational settings for the organizing and the multiplicity of modems in response to the results of the analyzing.

Additionally, in accordance with a preferred embodiment of the present invention, the method also includes generating packets with FEC codes.

Moreover, in accordance with a preferred embodiment of the present invention, the method also includes interleaving the order of the packets prior to the transmitting.

Further, in accordance with a preferred embodiment of the present invention, the method also includes receiving retransmission requests for at least one missing data packet, and retransmitting the at least one missing data packet.

There is also provided, in accordance with a preferred embodiment of the present invention, a method including receiving data packets along a multiplicity of channels from a remote reporting location, and assembling a video stream from the data packets.

Additionally, in accordance with a preferred embodiment of the present invention, the assembling includes using a jitter buffer to arrange the data packets in a logical order.

Moreover, in accordance with a preferred embodiment of the present invention, the jitter buffer includes the following logical windows: a receiving window, a retransmission window, and an output window.

Further, in accordance with a preferred embodiment of the present invention, the method also includes sending retransmission requests for missing data packets that are logically associated with the retransmission window.

Still further, in accordance with a preferred embodiment of the present invention, the method also includes tracking performance statistics for the assembling, and transmitting the performance statistics to the remote reporting location.

Additionally, in accordance with a preferred embodiment of the present invention, the performance statistics include performance details for modems used to upload the data packets from the remote reporting location.

Moreover, in accordance with a preferred embodiment of the present invention, the performance details include at least one of the following: missing data packets, invalid data packets, retransmission requests for the data packets, and length of transmission time for the data packets.

Further, in accordance with a preferred embodiment of the present invention, the method also includes analyzing said performance statistics, determining required changes to operational settings as per the analyzing, and transmitting the required changes to the remote reporting location.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 8A and 8B are schematic illustrations of a smart jitter buffer, constructed and operative in accordance with the present invention.

Figure 1A:
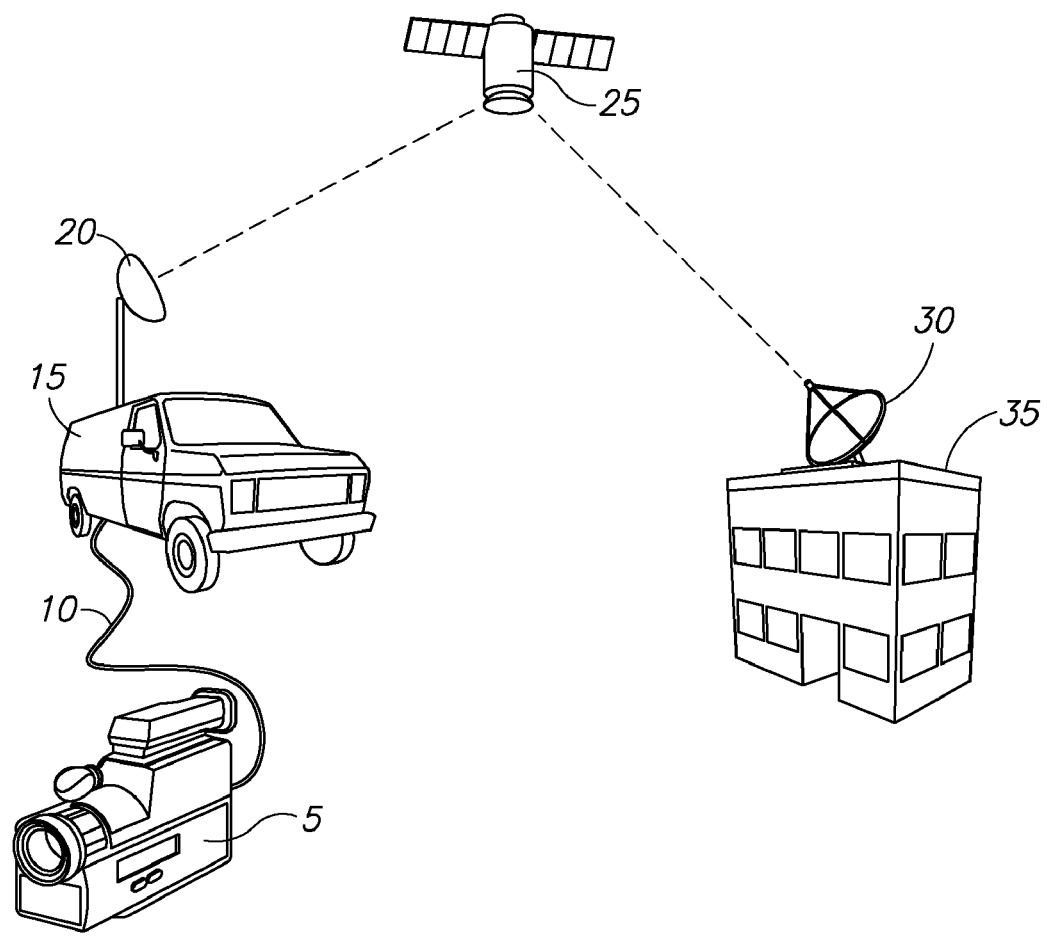
FIGS. 1A and 1B are schematic illustrations of prior art systems for remote broadcasting.
Figure 1B:
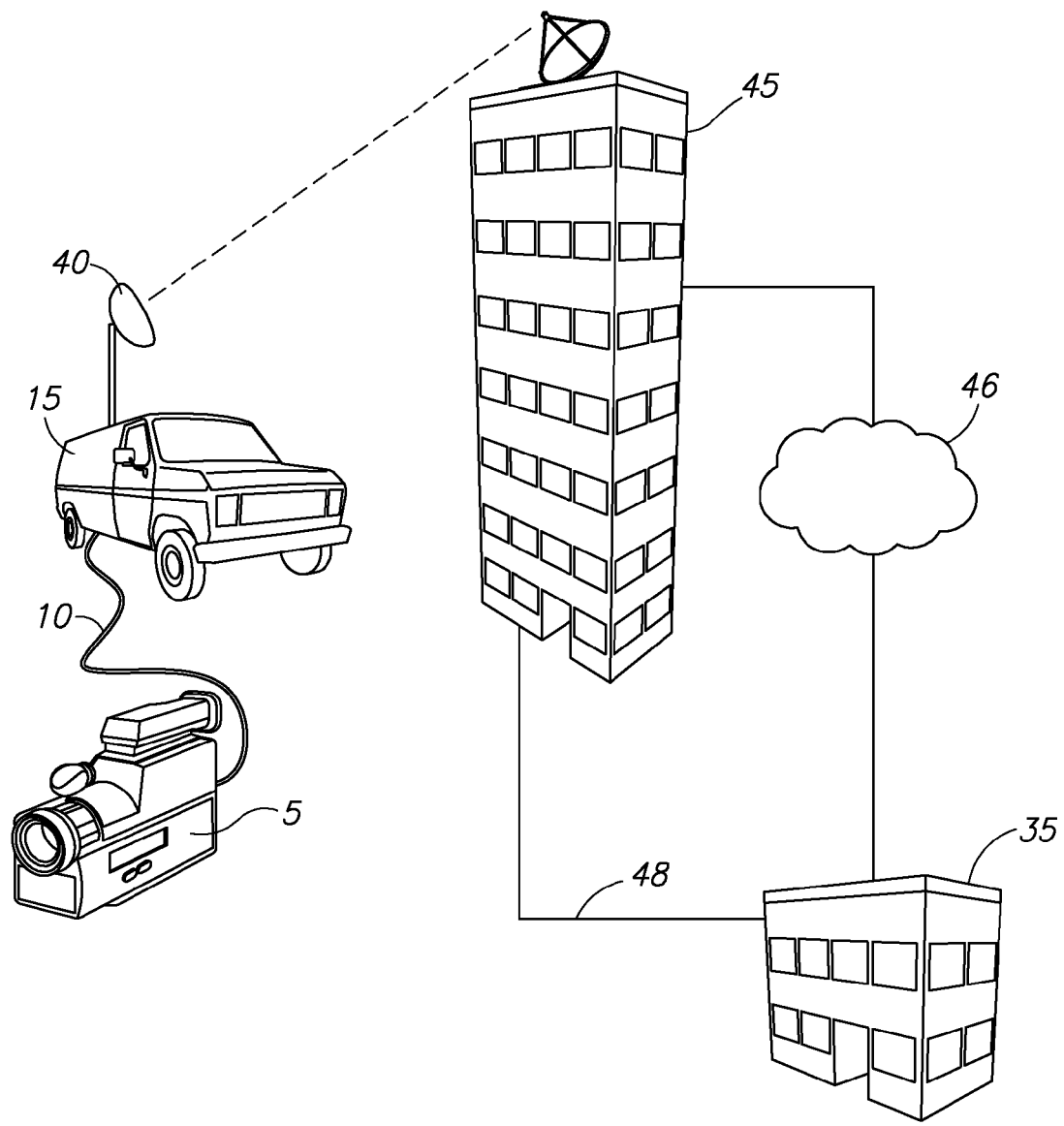

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that for the purpose of remote media uploads, cellular phone networks have several advantages. For example, such networks do not require line of sight connections and they may be used, for example, in closed buildings, underground garages, narrow alleys, and other venues.

It will be appreciated that the broadband services provided by mobile network operators are typically asymmetric. They generally provide greater bandwidth for the download of data and only limited bandwidth for uploading data. For example, 1 megabit per second may be provided for data downloads, whereas only 64 kilobits per second may be provided for data upload. Applicants have realized that multiple cellular devices may be used in concert in order to create a "virtual broadband" upload connection. In such a virtual broadband upload connection (virtual broadband connection), the sum total of the upload capacity of the devices may represent enough combined bandwidth to facilitate a generally live media transmission.

Figure 2:
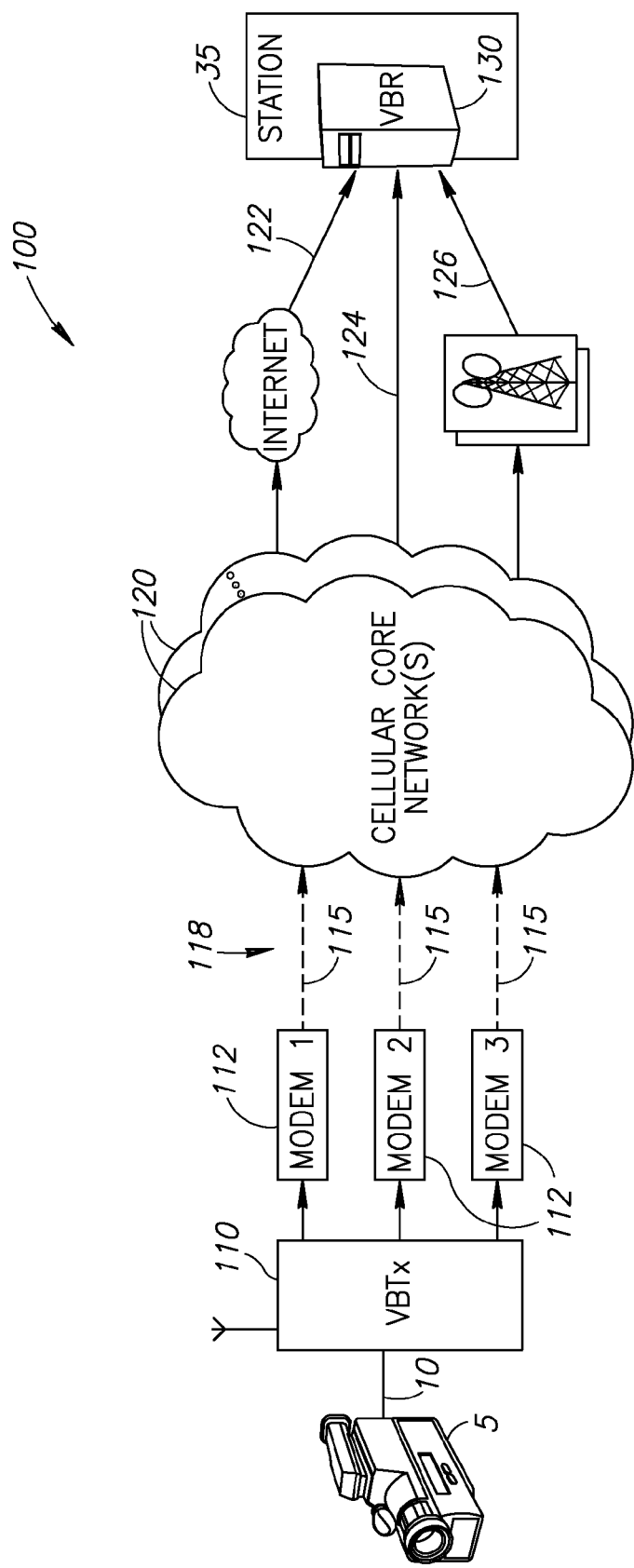
FIG. 2 is a schematic illustration of a novel virtual broadband system, constructed and operative in accordance with the present invention.

Reference is now made to FIG. 2 which illustrates a novel virtual broadband system 100 for the remote transport of live media data over a cellular network, constructed and operative in accordance with the present invention. As in the prior art, video camera 5 may be used to film news events at a remote location. Cable 10 may connect camera 5 to a virtual broadband upload unit 110, which may operate several cellular modems 112 to transmit media data through one or more cellular core networks 120. Each modem 112 may generate a separate logical channel 115 and the multiple channels 115 may constitute a virtual broadband connection 118.

It will be appreciated that, depending on the number of channels 115, the combined upload capacity of virtual broadband connection 118 may approximate that of a single, line of sight satellite or microwave connection.

From networks 120, the data may be transported to a virtual broadband receiver 130 via Internet connections 122, leased lines connections 124, cellular network connections 126 or any mix of the above connections. Virtual broadband receiver 130 may be located within studio 35, which may then broadcast the data to televisions, to the Internet, etc.

Networks 120 may be one or more cellular networks accessible from the remote location. It will be appreciated that one or more operators may provide such networks and that networks 120 may also use more than one technology. Accordingly, it will be appreciated that virtual broadband connection 118 may be comprised of a multiplicity of channels 115 being transmitted to one or more network operators, each of which operator may be operating one or more networks of possibly different technologies.

Channels 115 may be transported to virtual broadband receiver 130 via a number of routes, including, for example, Internet connection 122, leased line connection 124 and cellular network connection 126. As described hereinbelow, virtual broadband receiver 130 may accept data from a number of sources for processing.

It will be appreciated that the existing cellular communications system is designed to provide mobile connectivity. Accordingly, virtual broadband unit 110 may be significantly lighter than and more easily transported than the satellite and microwave systems of the prior art.

Figure 3:
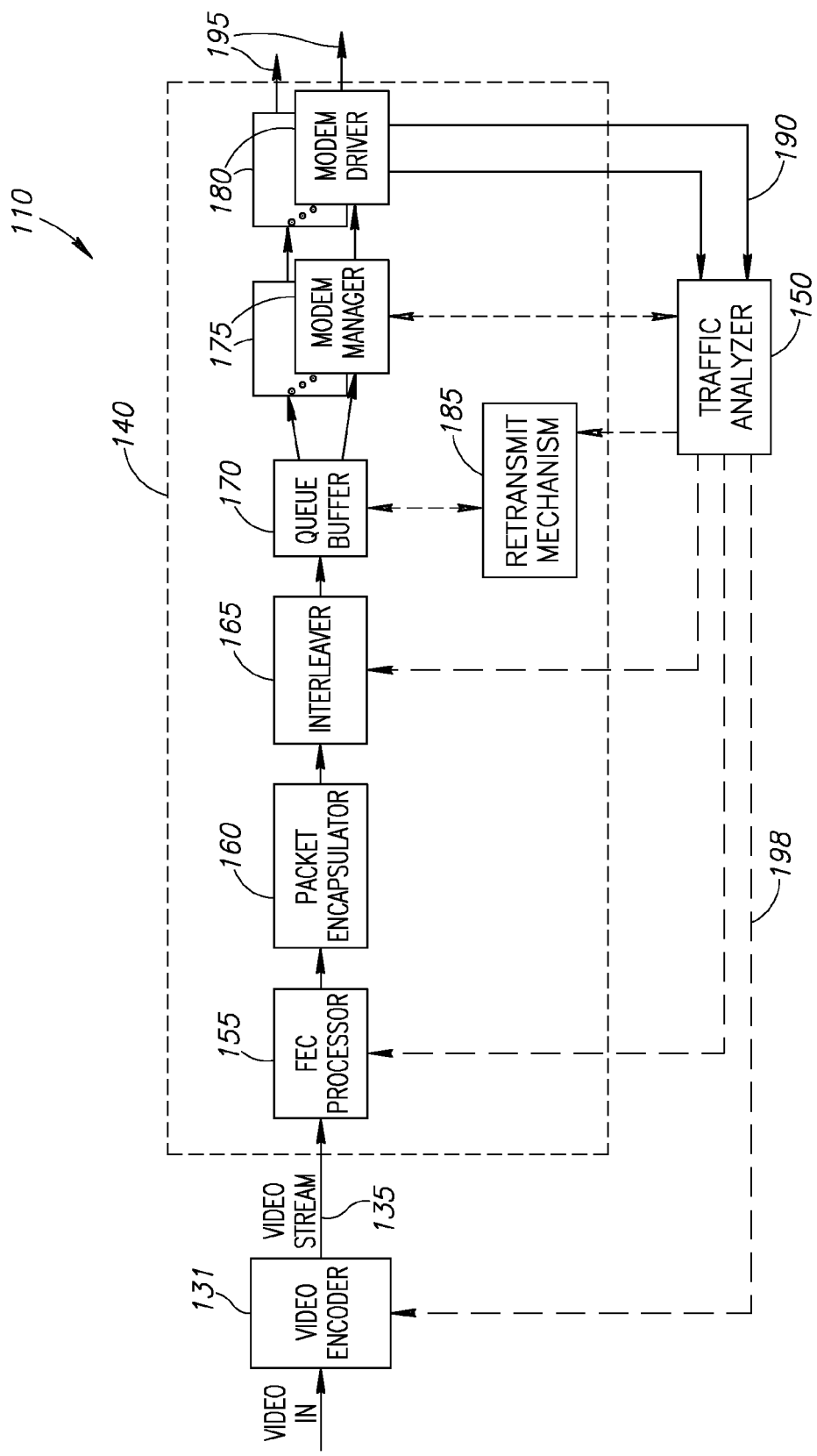
FIG. 3 is a schematic illustration of a virtual broadband transmitting unit, constructed and operative in accordance with the present invention.

Reference is now made to FIG. 3 which details an exemplary virtual broadband unit 110. Virtual broadband upload unit 110 may comprise a video encoder 131, a configurable stream processor 140, and a traffic analyzer 150. As described hereinbelow, configurable stream processor 140 may process an incoming video stream 135, from video encoder 131, to provide multiple upload streams 195, one per modem 112 (FIG. 2). Traffic analyzer 150 may configure the settings of configurable stream processor 140 based on current statistical feedback received via one or more back channels 190. Batteries (not shown) may also be included to provide a mobile power source.

Configurable stream processor 140 may comprise a forward error correction (FEC) module 155, a packet encapsulator 160, an interleaver 165, a queue generator 170, multiple modem managers 175, multiple modem drivers 180 and a retransmit mechanism 185. Video stream 135, which is input to configurable stream processor 140, may be encoded, for example with H.264 encoding, or it may be unencoded.

FEC processor 155 may initially divide the data of video stream 135 into packets and it may add extra packets with FEC codes. FEC codes consist of information that may be used to reconstruct missing or improper packets if the need arises. In an exemplary FEC scheme, FEC processor 155 may add an additional 10% of packets to the stream. If some packets are lost or improperly received, the FEC codes may be used to reconstruct the missing packets. It will be appreciated that the FEC percentage and the number of packets in a FEC grouping may be configurable. Configuration may generally be performed whenever a new channel 115 (FIG. 2) is opened. Reconfiguration may thus be performed whenever a new channel is opened or an existing one is changed. Any suitable algorithm may be used for FEC processor 155, for example, Reed-Solomon.

Packet encapsulator 160 may add serial numbers and time stamps to each video and FEC packet.

Figure 4:
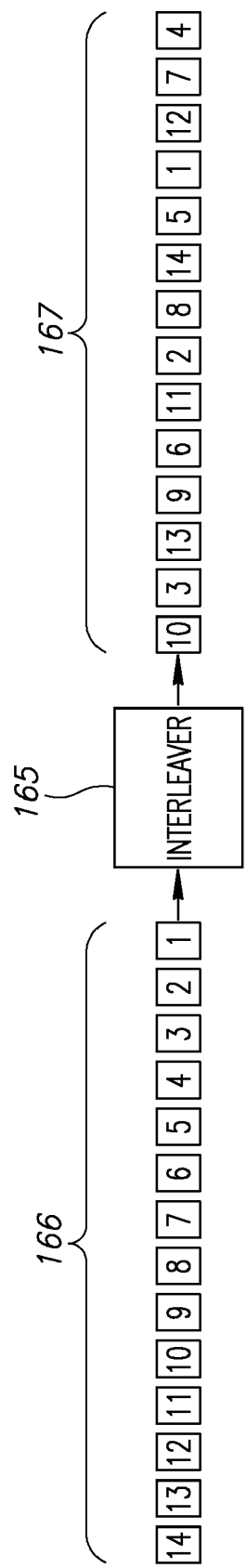
FIG. 4 is a schematic illustration of the inputs and outputs of a packet interleaver, constructed and operative in accordance with the present invention.

The packets may then proceed to interleaver 165. Interleaving may attempt to minimize the impact of packets lost as a result of a break in transmission. The packets may be "shuffled", resulting in an output order which may reduce exposure to the loss of consecutive packets due to a given transmission error. FIG. 4, to which reference is now briefly made, illustrates the operation of interleaver 165. Input packet queue 166 may have packets received in consecutive order 1, 2, 3, 4, etc. (as determined by the packet numbers assigned by packet encapsulator 160). Output packets 167 may be "interleaved"; the order may have been randomized such that consecutive packet numbers are no longer adjacent to one another. In FIG. 4, output packets 167 have the order 4, 7, 12, 1, 5, etc.

Interleaved packets 167 are then forwarded to queue generator 170 (FIG. 3) where they remain in a queue until pulled from the queue by one of the multiple modem managers 175. There may typically be one modem manager 175 for each modem 112 (FIG. 2). For every modem manager 175, there may be an associated modem driver 180. Modem drivers 180 may manage the individual modems 112 used to transmit the packets.

After a packet has been pulled by modem manager 175, a copy of its physical data may be forwarded to retransmission queue 185 where it may remain in place until its space is required for a new packet. Accordingly, the packet may still be available for retransmission for a period of time after it is initially pulled by one of the modem managers 175. Retransmit mechanism 185 may search retransmission queue 185 for a packet needed for retransmission. Once the required packet is found, it may be advanced to the head of the queue so that the relevant modem manager 175 may retransmit it as quickly as possible.

Figure 5:
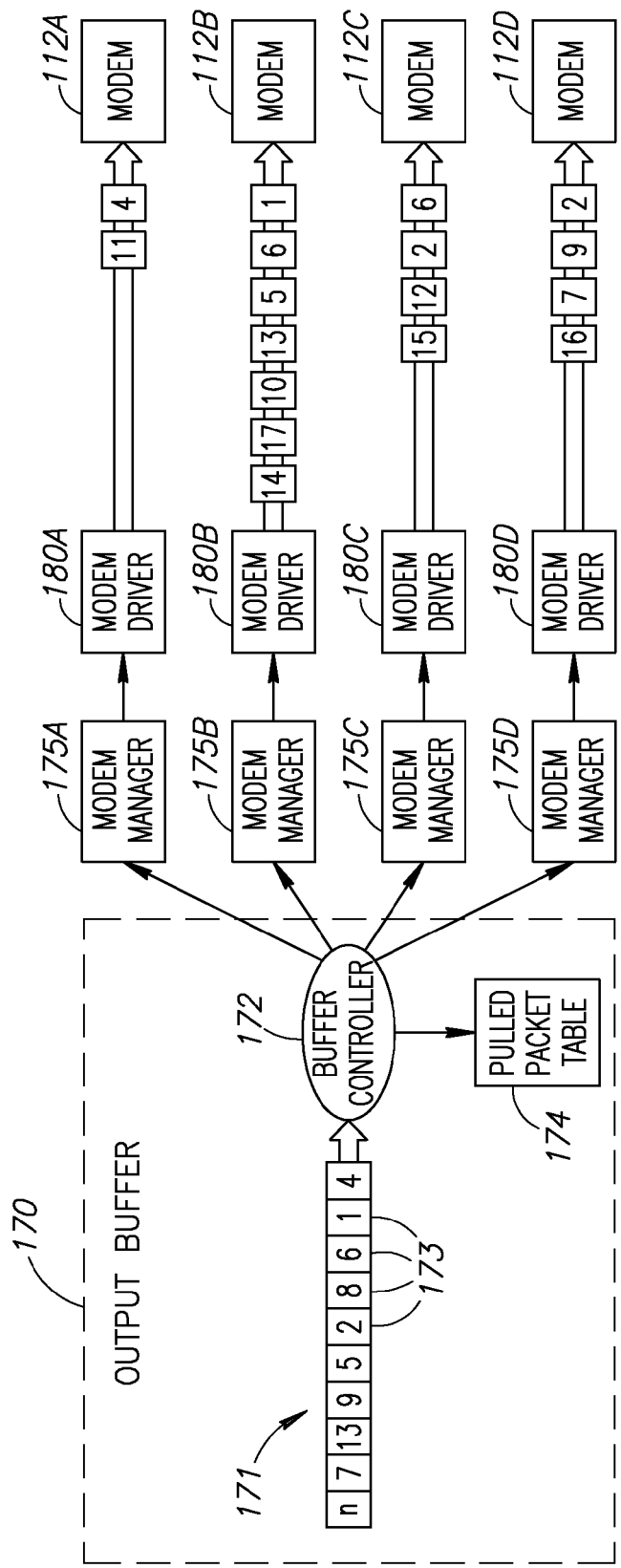
FIG. 5 is a schematic illustration of the flow of data packets through a multiplicity of modems, constructed and operative as a part of the system of FIG. 2.

Reference is now briefly made to FIG. 5, which illustrates how modem managers 175 may pull packets from queue generator 170 and may forward them to modem drivers 180. Queue generator 170 may comprise an output buffer 171 and a buffer controller 172. As shown, output buffer 171 may contain interleaved packets 173 waiting to be pulled by modem managers 175. Four modem managers 175A, 175B, 175C and 175D are shown. Each modem manager 175(A,B,C,D) may be associated with one modem driver 180(A,B,C,D), which in turn manages one associated modem 112(A,B,C,D).

Each modem 112 may have different performance characteristics. For example, modem 112B may be capable of the highest connection speed. Modem 112C may be capable of a similar speed, but may have a higher rate of observed errors. Modem 112D may be relatively slow, but it may experience very few errors. Modem 112A may be a high quality, state of the art modem, but it may connect with a core network 120 (FIG. 2) that currently has a high error rate. It will thus be appreciated that a variety of factors may impact on the actual performance of a given modem 112. Such factors may include, for example, modem speed, modem reliability, connection quality, operating license limitations, and network congestion. It will further be appreciated that such factors may not be constant; a given modem 112 may perform at different levels over the course of a short period of time.

Therefore, each modem manager 175 may be configured to "feed" its associated modem driver 180 as per a rate optimal under the current prevailing conditions. Accordingly, as per the example illustrated by FIG. 5, modem manager 175B may be assigned a very high rate; seven of the seventeen packets 173 shown may be forwarded through modem driver 180B. Modem managers 175C and 175D may be assigned a lower rate, each passing only four packets 173 to modem drivers 180C and 180D respectively. Modem manager 175A may be assigned a still lower rate. It may pass only two packets 173 to modem driver 180A.

Accordingly each modem manager 175 may query buffer controller 172 at a different rate for the next available packet 173. It will be appreciated, that in such a manner already interleaved packets 173 are inequitably distributed amongst modems 112, thus effectively undergoing a second interleaving process.

As packets 173 are pulled by modem managers 175, buffer controller may record the packet number and the modem manager 175 which transferred it for transmission in a pulled packet table 174. As described hereinbelow, table 174 may be used to analyze the performance of individual modems 112.

It will also be appreciated, as noted hereinabove, that the performance of each modem 112 may change during the course of a given upload session. It will further be appreciated that the overall performance trend for all of the involved modems 112 may also change during the course of an upload session. Therefore, in accordance with a preferred embodiment of the preset invention, traffic analyzer 150 (FIG. 3) may analyze actual performance statistics from the ongoing upload session in order to improve the settings for configurable IP stream processor 140.

Returning to FIG. 3, multiple back channels 190 may pass performance data from virtual broadband receiver 130 (FIG. 2) to traffic analyzer 150. Such data may include, for example, time stamps for the arrival of packets, missing packet numbers, packet numbers with errors, and requests to retransmit packets.

Traffic analyzer 150 may forward such retransmission requests to retransmit mechanism 185. It will be appreciated that since duplicate data may be transmitted via each of multiple back channels 190, multiple copies of such retransmission requests may be received by retransmit mechanism 185. Accordingly retransmit mechanism 185 may track the receipt of such requests, and ignore any duplicates. Mechanism 185 may then process such requests as already described hereinabove.

Traffic analyzer 150 may also query pulled packet table 174 of queue generator 170 to associate the packet numbers received via back channel 190 with the modem managers 175 that processed the original packets. Traffic analyzer 150 may analyze this information to detect performance trends among the modems 112. If a modem 112 has a high, or rising, rate of errors, missing packets or delay, traffic analyzer 150 may instruct the associated modem manager 175 to lower its rate or even shut down its associated modem 112. Similarly, in response to a reduction in errors, missing packets and/or delay, traffic analyzer 150 may instruct the associated modem manager 175 to raise the transmission rate of its associated modem 112.

Traffic analyzer 150 may also seek to balance rates among modem managers 175. For example, if several modem managers 175 are instructed to lower rates, then the other modem managers 175 may be instructed to raise their rates to compensate for the anticipated reduction in overall throughput.

Traffic analyzer 150 may also identify overall performance trends. For example, current statistics may indicate that few, if any, packets are being lost. In such a case, traffic analyzer 150 may instruct interleaver 165 to reduce the level of interleaving. Another exemplary trend may include an overall higher level of errors detected. In such a case, traffic analyzer 150 may instruct FEC processor 155 to increase the FEC overhead or to alter the compression rate of the video data received from encoder 131.

An overall high level of errors and missing packets may result in a situation in which the combined rate of all of the modem managers 175 may be insufficient to transmit all of video stream 135 in a timely manner. In such a case, traffic analyzer 150 may use feedback channel 198 to instruct video encoder 131 (FIG. 3) to increase the compression rate in order to reduce the bandwidth required to transmit video stream 135 after processing.

Figure 6:
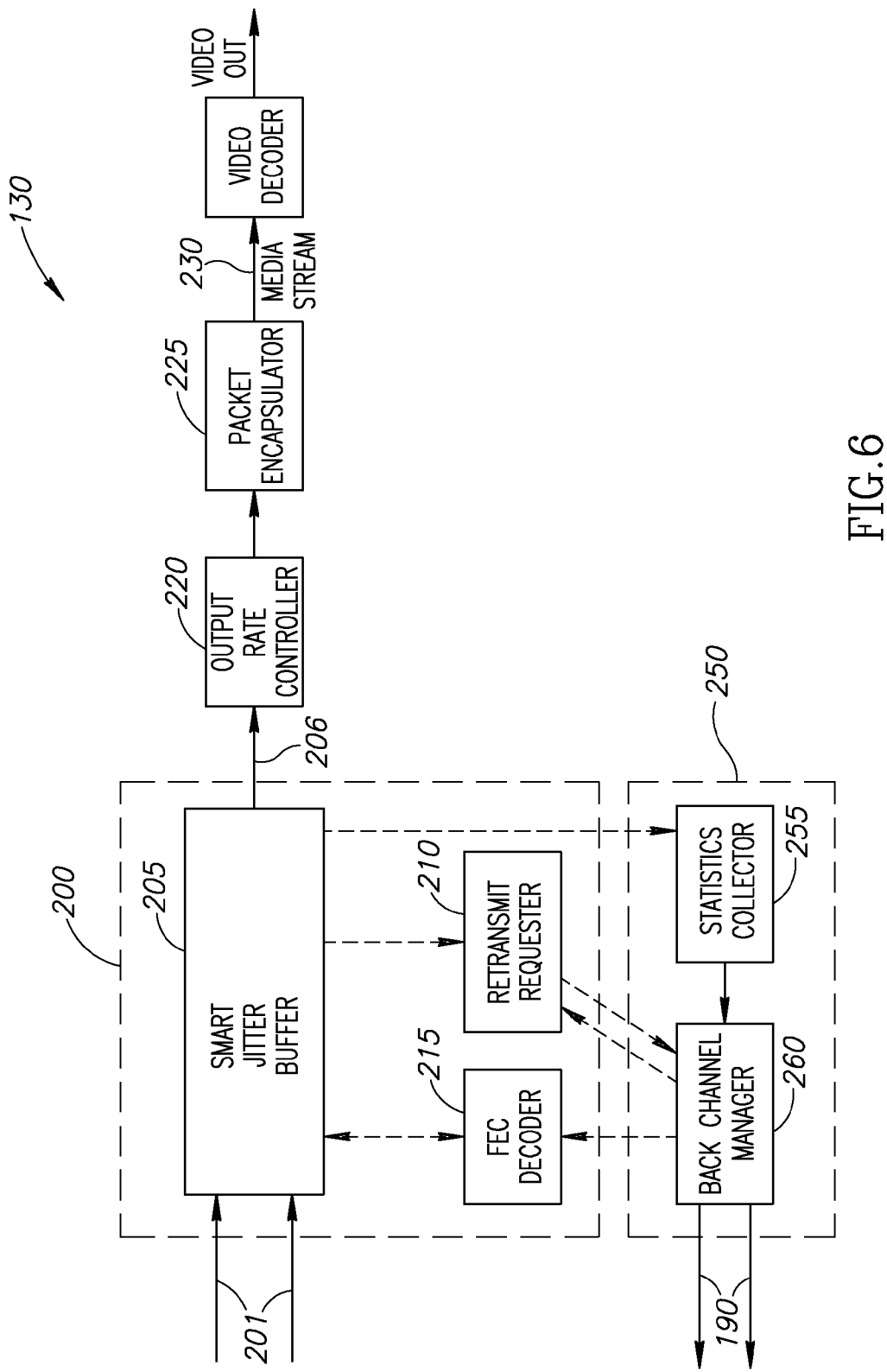
FIG. 6 is a schematic illustration of a virtual broadband receiving unit, constructed and operative in accordance with the present invention.

Reference is now made to FIG. 6 which details virtual broadband receiver 130, constructed and operated in accordance with a preferred embodiment of the present invention. Receiver 130 may comprise an assembly engine 200, an output rate controller 220, a packet decapsulator 225 and a feedback manager 250.

Assembly engine 200 may receive multiple streams 201, via connections 122, 124 and/or 126, for processing. The assembled stream, labeled 206, may then be forwarded to output rate controller 220, which in turn may forward it to packet decapsulator 225 to remove the extra packet information. The resulting media data stream 230 may then be output from virtual broadband receiver 130 to TV station 35 (FIG. 2). Feedback manager 250 may receive retransmit requests from assembly engine 200 and may collect the statistics of the incoming streams 201. Feedback manager 250 may also provide the retransmit requests and the statistics along back channel 190 to traffic analyzer 150 (FIG. 3).

As mentioned hereinabove, multiple streams 201 may be received from several different connections, for example, Internet connections 122, leased line connections 124, and/or cellular network connections 126. Regardless of the connections used for transmission, the packets in streams 201 may be input to assembly engine 200 as is, per their order of arrival.

Assembly engine 200 may comprise a smart jitter buffer 205, an FEC decoder 215, and a retransmit requester 210. FEC decoder 215 may be any suitable FEC decoder, such as is known in the art and compatible with the FEC used in the virtual broadband upload unit 110. Smart jitter buffer 205 may serve two purposes: it may be the area where the packets of streams 201 are "de-interleaved", and it may also provide a framework for use by FEC and retransmit mechanisms 215 and 210 while resolving missing packets.

Figure 7:
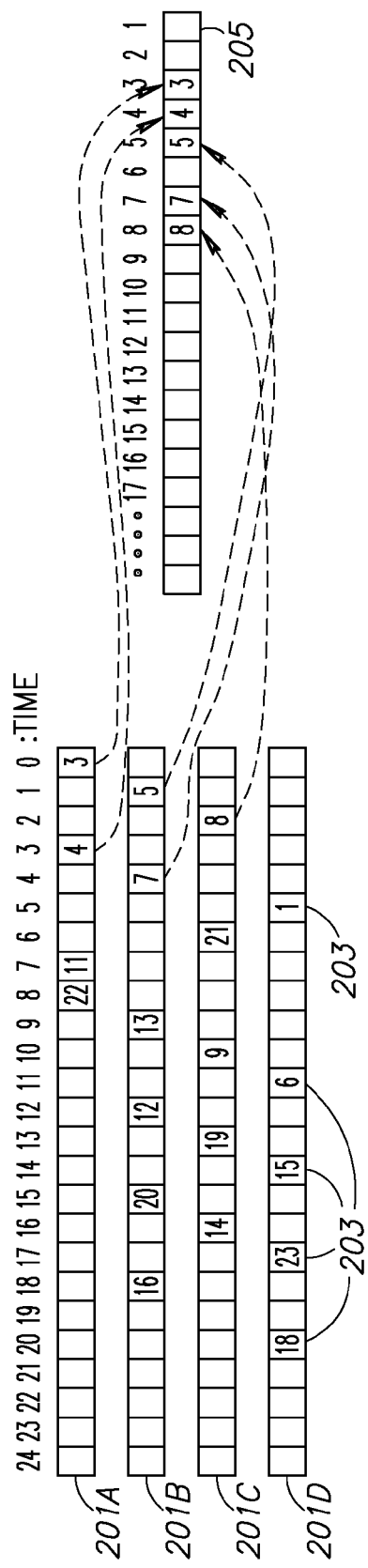
FIG. 7 is a schematic illustration of arriving data packets as they are sorted in a smart jitter buffer, constructed and operative in accordance with the present invention.

Reference is now briefly made to FIG. 7 which illustrates how packets 203 from streams 201 may be placed into smart jitter buffer 205. An exemplary size for smart jitter buffer may be 100-1000 msec. Four input streams 201A, 201B, 201C and 201D are shown as is a timestamp, from 0 to 24, where 0 is the rightmost timestamp. Accordingly, packet #3, arriving at timestamp 0, may be the first packet 203 to be processed.

Smart jitter buffer 205 may have consecutively numbered bins, where, in FIG. 7, the bins are labeled from 1 to 17. As each packet 203 is received, it may be placed in its associated bin, according to its packet number. Thus, packet #3 which arrived first, may be placed in bin 3. The packets stored in buffer 205 may therefore represent packets 203 in their original order, even though their order of arrival may have been 3,5,8,4,7.

In the example of FIG. 7, packets 1, 2 and 6 are still missing. Thus, buffer 205 may indicate which packets have not arrived.

Reference is now made to FIGS. 8A and 8B which illustrate how FEC decoder 215 and retransmit requester 210 make use of smart jitter buffer 205. FIG. 8A shows how retransmit requester 210 may logically divide buffer 205 into three windows: an output window 211, a retransmission window 212, and a receiving window 213. Output window 211 may store the data to be transmitted as serial packet stream 206.

It will be appreciated that windows 211, 212, and 213 may not be fixed in static locations vis-à-vis smart jitter buffer 205. They may instead be dynamically defined in terms of offsets from the most recent packet 203 to be output from smart jitter buffer 205. FIG. 8A thus represents a snapshot in time, where output window 211 stores an exemplary six packets waiting for output, of which packet #1 may be the first in line. Once packet #1 has been added to serial packet stream 206, output window 211 may shift to include packets #2-7.

Therefore, it will also be appreciated that packets 203 may not change physical position once placed in smart jitter buffer 205. In actuality, a constant shifting of windows 211, 212, and 213 may result in the illusion of "movement" along the buffer. Accordingly, it will be appreciated that any discussion hereinbelow regarding movement or procession by packets 203 within smart jitter buffer 205 may refer only to logical movement as defined by the shifting of windows 211, 212, and 213.

As discussed hereinabove, packets 203 may not arrive in serial order, particularly as they may have been interleaved prior to transmission and may have been transmitted and/or received via multiple connections and channels. Accordingly, as packets 203 may be received, they may be placed in receiving window 213 in order according to their packet number. An exemplary size for receiving window 213 may be 50-400 ms. No action may be taken to replace missing packets 203 at this stage; there may be a reasonable assumption that any missing packets may still arrive without added processing. For example, in FIG. 8A, packet #17 may not yet have arrived because it was transmitted after packets 16-23 (due to interleaving, for example). For this purpose, retransmission window 213 may be large, of, for example 200-1000 msec.

Packets 203 may then proceed to retransmission window 212. This window may define a window of opportunity to request retransmission of missing packets 203. As described hereinabove, prior to this stage it may be unnecessary to request retransmission, since it may still be likely that a missing packet may arrive in any case. Conversely, subsequent to this stage, it may be too late to request a retransmission, since such a request requires a certain amount of turn around time to complete—the request must first reach virtual broadband unit 110 (FIG. 2) and then the retransmitted packet 203 must still arrive in a timely manner to be added to serial packet stream 206. Accordingly, a retransmit threshold 214 may define a point at which retransmit requests may no longer be a viable option for a given packet 203.

As per the exemplary data in FIG. 8A, packet #10 may be missing from retransmission window 212. Retransmit requester 210, which may view retransmission window 212, may therefore submit a retransmission request to feedback manager 250. Retransmit requester 210 may submit one or more such requests as long missing packet #10 is "located" within retransmission window 212. The timing for such requests may be configurable.

It will be appreciated that the size and location of retransmission window 212 may be configurable. For example, when there is a low rate of missing packets, it may be possible to use a small window 212, such as only 200 msec. If a virtual broadband unit 110 has fast modems, it may be possible to reduce the size of output window 211 in light of the fact that turn around time for retransmission may be quicker. It will, therefore, also be appreciated that the size and location of retransmission window 212 may effectively determine the size and location of windows 211 and 213.

Packets 203 may then proceed to output window 211. As described hereinabove, once a missing packet 203 has reached output window 211, no more retransmit requests may be sent on its behalf. It will be appreciated, however, that missing packets 203 may still arrive and be placed in output window 211. For example, a retransmit request may have previously been submitted from retransmission window 213 for packet #2. If packet #2 may arrive in time it may still be placed as per its serial order in output window 211.

FIG. 8B shows how FEC decoder 215 may divide buffer 205 into three windows similar to those used by retransmit requester 210: an output window 216, an activation window 217, and a receiving window 218. Output window 216 may be defined as starting from an FEC threshold 219 and may generate serial packet stream 206. Once again, it will be appreciated that any discussion hereinbelow regarding movement or procession by packets 203 within smart jitter buffer 205 may refer only to logical movement as defined by the shifting of windows 216, 217, and 218.

Functionally, output window 216 and receiving window 218 may be equivalent to windows 211 and 213 respectively, as defined for retransmit requester 210. Missing packets 203 may not be addressed while still in receiving window 218, and no further processing may be initiated for missing packets 203 that have passed FEC threshold 219 and entered output window 216. However, similar to the relationship between window 212 and windows 211 and 213, the size and location of windows 216 and 218 may be determined by the size and location of activation window 217. Accordingly, even though windows 216 and 218 are functionally similar to windows 211 and 213, their respective sizes and locations may be different.

Missing packets in activation window 217 may be reconstructed using the FEC codes of other packets 203 that have already arrived and been placed in smart jitter buffer 205. The size and location of activation window 217 may therefore be functions of the FEC percentages used and the amount of time required to reconstruct a given packet 203.

For example, FIG. 8B shows window 217 as being an exemplary ten packets 203 in size. This may illustrate a case where a FEC percentage has been defined requiring nine received packets 203 in order to reconstruct a tenth packet, for example, missing packet #10. FIG. 8B also shows an exemplary size of five packets 203 for output window 216. This may illustrate a case where the time required to reconstruct a missing packet may be close to the time that it may take for five packets 203 to be output.

It will be appreciated that the sizes and locations of both retransmission window 212 and activation window 217 may be exemplary. Other sizes and locations may be configured as per specific requirements and/or prevailing conditions. It will also be appreciated that the sizes and locations may be reconfigured during operation in order to compensate for changing conditions and/or error rates. It will further be appreciated that both retransmit requester 210 and FEC decoder 215 may use the same smart jitter buffer 205 simultaneously. Accordingly, mechanisms 210 and 215 may have configurable settings for precedence in order to avoid conflicting and/or redundant actions.

Returning to FIG. 6, serial packet stream 206 from assembly engine 200 may be forwarded to output rate controller 220. It will be appreciated that serial packet stream 206 may ultimately be intended for a live broadcast over television. Accordingly, output rate controller 220 may regulate the rate at which serial packet stream 206 is released in order to maintain an appropriate broadcast rate.

The output of controller 220 may then be forwarded to packet decapsulator 225, where the packet overhead, including, for example, packet numbering and timestamps, may be removed. The resulting media stream 230 may then be broadcast and/or saved for later use.

Feedback manager 250 may comprise a statistics collector 255 and a back channel manager 260. Statistics collector 255 may receive a constant stream of packet statistics from smart jitter buffer 205. Such statistics may include, for example, the numbers of missing/reconstructed packets, as well as time stamps and packet numbers for packets received. Statistics collector 255 may then forward these statistics to back channel manager 260. Such statistics may be forwarded in a raw state with little or no pre-processing. Such statistics may eventually be processed and analyzed by traffic analyzer 150 (FIG. 3). However, in accordance with an alternative preferred embodiment of the present invention, such processing may also be included in feedback manager 250.

Back channel manager 260 may also receive retransmit requests from retransmit requester 210. Back channel manager 260 may then transmit such statistics and retransmit requests to virtual broadband unit 110 (FIG. 3) via back channel 190. Back channel 190 may be any suitable connection with virtual broadband unit 110.

As discussed hereinabove, by using such packet statistics, traffic analyzer 150 may be able to optimize the quality and flow of the multiplicity of connections 115 (FIG. 2), thereby to create virtual broadband connection 118. It will be appreciated that the combination of such optimization with the error checking and correction features of virtual broadband receiver 130 may provide enhanced end-to-end quality of service for system 100.

In an alternative embodiment of the present invention, non cellular wireless technologies may also be used for connections 115. For example, WiFi and/or WiMax and/or satellite (e.g. BGAN) technologies may be used, instead of, or in addition to cellular networks, to connect virtual broadband unit 110 to the internet Similarly, WiFi and/or WiMax and/or satellite may be used by virtual broadband receiver 130 to receive streams 201 (FIG. 6).

In another alternative embodiment of the present invention, virtual broadband receiver 130 may be a mobile unit at a remote location. It may receive stream 201 via the same technologies used for transmitting, for example, cellular networks, WiFi and/or WiMax.

In another alternative embodiment of the present invention, virtual broadband unit 110 and virtual broadband receiver 130 may share wireless resources and/or may even be housed in the same physical unit.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A virtual broadband transmitting unit comprising:
   a stream generator to generate a multiplicity of data streams from an incoming live media transmission at a remote reporting location;
   a multiplicity of modems, each associated with one of at least one wireless communication network; and
   a transmission manager to control the upload of said multiplicity of data streams through a selected set of said modems associated with those of said at least one wireless communication network accessible from said remote reporting location.

2. The unit according to claim 1 and wherein said incoming live media transmission comprises at least one of video and audio data.

3. The unit according to claim 1 and also comprising a video encoder to encode said live media transmission.

4. The unit according to claim 1 and where said at least one wireless network is at least one of the following: a mobile cellular network, a WiFi network, a WiMax network and a satellite network.

5. The unit according to claim 1 and wherein said stream generator comprises a data packet generator comprising at least one of:
   a forward error correction (FEC) processor to provide FEC codes to each said data stream;
   a packet encapsulator to generate numbered data packets from each said data stream; and
   an interleaver to shuffle said data packets.

6. The unit according to claim 5 and wherein said stream generator also comprises a queue buffer to receive said data packets from said packet generator and a retransmission queue to store copies of said packets for retransmission.

7. The unit according to claim 5 and wherein said stream generator comprises said multiplicity of modems to transmit said multiplicity of data streams.

8. The unit according to claim 7 wherein each said modem comprises an associated modem manager and wherein each said associated modem manager comprise means to pull a next said data packet from said data packet generator for transmission via said modem.

9. The unit according to claim 1 and also comprising a back channel for receiving feedback regarding at least one of the timeliness and quality of said multiplicity of data streams.

10. The unit according to claim 9 and wherein said feedback comprises at least one of missing data packets, reconstructed data packets, serial numbers and time stamps of packets received, and requests for retransmission of data.

11. The unit according to claim 10 and wherein said transmission manager comprises means to search a retransmission queue to locate a copy of at least one of said missing data packets and to forward a found copy for retransmission.

12. The unit according to claim 9 and wherein said transmission manager comprises a traffic analyzer to analyze said feedback and adjust settings for components of said stream generator in response to said analysis.

13. The unit according to claim 11 and wherein said components comprise at least one of a video encoder, a FEC processor, a packet encapsulator, an interleaver, a queue buffer, and a modem manager.

14. A method for remote reporting comprising:
   organizing video data of a live media transmission generated at a remote reporting location into data packets;
   having a multiplicity of modems, each associated with one of at least one wireless communication network; and
   uploading said data packets through a selected set of said modems associated with those of said at least one wireless network accessible from said remote reporting location to a broadcasting station.

15. The method according to claim 14 and wherein said at least one wireless network is at least one of the following: a cellular network, WIFI, WIMAX or satellite.

16. The method according to claim 14 and wherein said at least one wireless network is at least two separate cellular networks.

17. The method according to claim 16 and wherein said at least two separate cellular networks use at least two different mobile telephone technologies.

18. The method according to claim 14 and also comprising:
   receiving feedback regarding the success of said uploading;
   analyzing said feedback; and
   adjusting operational settings for said organizing and said multiplicity of modems in response to results of said analyzing.

19. The method according to claim 14 and also comprising generating packets with FEC codes.

20. The method according to claim 14 and also comprising interleaving the order of said packets prior to said uploading.

21. The method according to claim 14 and also comprising:
   receiving retransmission requests for at least one improperly received said data packet; and
   retransmitting said at least one improperly received data packet.

* * * * *